United States Patent
Shin et al.

(10) Patent No.: US 8,260,945 B2
(45) Date of Patent: Sep. 4, 2012

(54) SYSTEM AND METHOD FOR WIRELESSLY BROADCASTING CONTENT FROM A CORE FOR RECEIPT BY A MOBILE CLIENT

(75) Inventors: John Shin, Clarksville, MD (US); Sigfus Bjornsson, Reykjavik (IS)

(73) Assignee: ABSI Corporation, Rockville, MD (US)

( * ) Notice: Subject to any disclaimer, the term of this patent is extended or adjusted under 35 U.S.C. 154(b) by 0 days.

(21) Appl. No.: 12/966,598

(22) Filed: Dec. 13, 2010

(65) Prior Publication Data

US 2011/0078322 A1    Mar. 31, 2011

Related U.S. Application Data

(63) Continuation of application No. 11/600,471, filed on Nov. 15, 2006, now Pat. No. 7,853,686.

(60) Provisional application No. 60/737,464, filed on Nov. 16, 2005.

(51) Int. Cl.
    *G06F 15/16* (2006.01)
    *H04N 7/173* (2011.01)
(52) U.S. Cl. .............. 709/230; 725/91; 725/97
(58) Field of Classification Search ........... 709/224, 709/230; 725/91, 97
    See application file for complete search history.

(56) References Cited

U.S. PATENT DOCUMENTS

| | | | |
|---|---|---|---|
| 5,544,313 A | 8/1996 | Shachnai et al. | |
| 6,069,957 A | 5/2000 | Richards | |
| 7,219,153 B1 | 5/2007 | Day | |
| 7,222,185 B1 | 5/2007 | Day | |
| 7,248,830 B2 | 7/2007 | Hashimoto et al. | |
| 7,260,601 B1 | 8/2007 | Day et al. | |
| 7,277,870 B2 | 10/2007 | Mourad et al. | |
| 7,293,066 B1 | 11/2007 | Day | |
| 2002/0019982 A1 | 2/2002 | Aratani et al. | |
| 2002/0059614 A1 | 5/2002 | Lipsanen et al. | |
| 2002/0124024 A1 | 9/2002 | Patterson et al. | |
| 2002/0193066 A1 | 12/2002 | Connelly | |
| 2003/0002515 A1* | 1/2003 | Crinon et al. | 370/412 |
| 2003/0005452 A1 | 1/2003 | Rodriguez | |
| 2003/0005453 A1 | 1/2003 | Rodriguez et al. | |
| 2003/0027592 A1 | 2/2003 | Hashimoto et al. | |
| 2003/0187978 A1 | 10/2003 | Nakamura et al. | |
| 2003/0221197 A1 | 11/2003 | Fries et al. | |

(Continued)

FOREIGN PATENT DOCUMENTS

WO    WO 01/17255 A1    3/2001

OTHER PUBLICATIONS

ETSI; "Digital Video Broadcasting specification for data broadcasting"; Nov. 2004; ETSI EN 301 192; v1.4.1; pp. 1-78.*

(Continued)

*Primary Examiner* — Jeffrey Nickerson
(74) *Attorney, Agent, or Firm* — Global IP Counselors, LLP

(57) ABSTRACT

A system and method for providing content over a network. In particular, the system and method is capable of providing content, such as broadband streaming multimedia and Internet Protocol (IP) data, to network devices, including mobile devices, with interactive functionality. The network employs at least one core and a plurality of clients. The core and clients each comprise a plurality of modules that cooperatively communicate with each other to monitor and control the delivery of content and to allow for interactive functionality by a user.

20 Claims, 13 Drawing Sheets

U.S. PATENT DOCUMENTS

| | | | |
|---|---|---|---|
| 2004/0049796 | A1 | 3/2004 | Briggs |
| 2004/0255321 | A1 | 12/2004 | Matz |
| 2005/0015812 | A1 | 1/2005 | Banet et al. |
| 2005/0071882 | A1 | 3/2005 | Rodriguez et al. |
| 2005/0210523 | A1* | 9/2005 | Parnell et al. .................. 725/97 |
| 2005/0281270 | A1 | 12/2005 | Kossi et al. |
| 2006/0025068 | A1 | 2/2006 | Regan et al. |
| 2006/0030312 | A1 | 2/2006 | Han et al. |
| 2006/0117355 | A1 | 6/2006 | Dureau et al. |
| 2006/0171390 | A1 | 8/2006 | La Joie |
| 2006/0236361 | A1 | 10/2006 | Kelly et al. |
| 2006/0253600 | A1* | 11/2006 | Hannuksela .................. 709/231 |
| 2007/0240188 | A1* | 10/2007 | Vermola et al. ................. 725/62 |
| 2009/0320077 | A1* | 12/2009 | Gazdzinski .................... 725/62 |

OTHER PUBLICATIONS

DVB; "IP Datacast over DVB-H: Service Purchase and Protection (SPP)"; Dec. 2005; DVB Document A100; pp. 1-278.*

ETSI; "Digital Video Broadcasting (DVB); IP Datacase over DVB-H: Architecture"; May 2006; ETSI; ETSI TR 102 469 v 1.1.1; pp. 1-38.*

European Search report of corresponding European Application No. 06 83 7759.7-1247 / 1955219, dated May 30, 2011.

DVB Organization: "IPDC Services Purchase and Protection", DVB, Digital Video Broadcasting, C/O EBU-17A Ancienne Route—CH-1218 Grand Saconnex, Geneva—Switzerland, Sep. 24, 2004.

* cited by examiner

US 8,260,945 B2

SYSTEM AND METHOD FOR WIRELESSLY BROADCASTING CONTENT FROM A CORE FOR RECEIPT BY A MOBILE CLIENT

This application is a continuation of U.S. patent application Ser. No. 11/600,471, filed on Nov. 15, 2006, and claims the benefit of U.S. Provisional Patent Application Ser. No. 60/737,464 filed on Nov. 16, 2005, the entire content of each being incorporated herein by reference.

FIELD OF THE INVENTION

The invention relates generally to a system and method for providing content over a network. More particularly, the present invention relates to a system and method capable of providing content, such as broadband streaming multimedia and Internet Protocol (IP) data, to network devices, including mobile devices, with interactive functionality.

BACKGROUND

Many systems currently exist for providing various types of content to mobile devices. For example, most, if not all, mobile telephone service provider systems also provide text messaging, Internet access, and email services, to name a few. Various types of personal data assistants (PDAs) are also capable of accessing the Internet and providing types of voice, video and data services.

In spite of these existing systems, a continued need exists for improved systems and methods for providing broadband content, such as streaming multimedia, voice, data, and so on, to mobile and fixed devices in an effective and efficient manner, while also allowing for interactive functionality.

DETAILED DESCRIPTION

Figure 1:
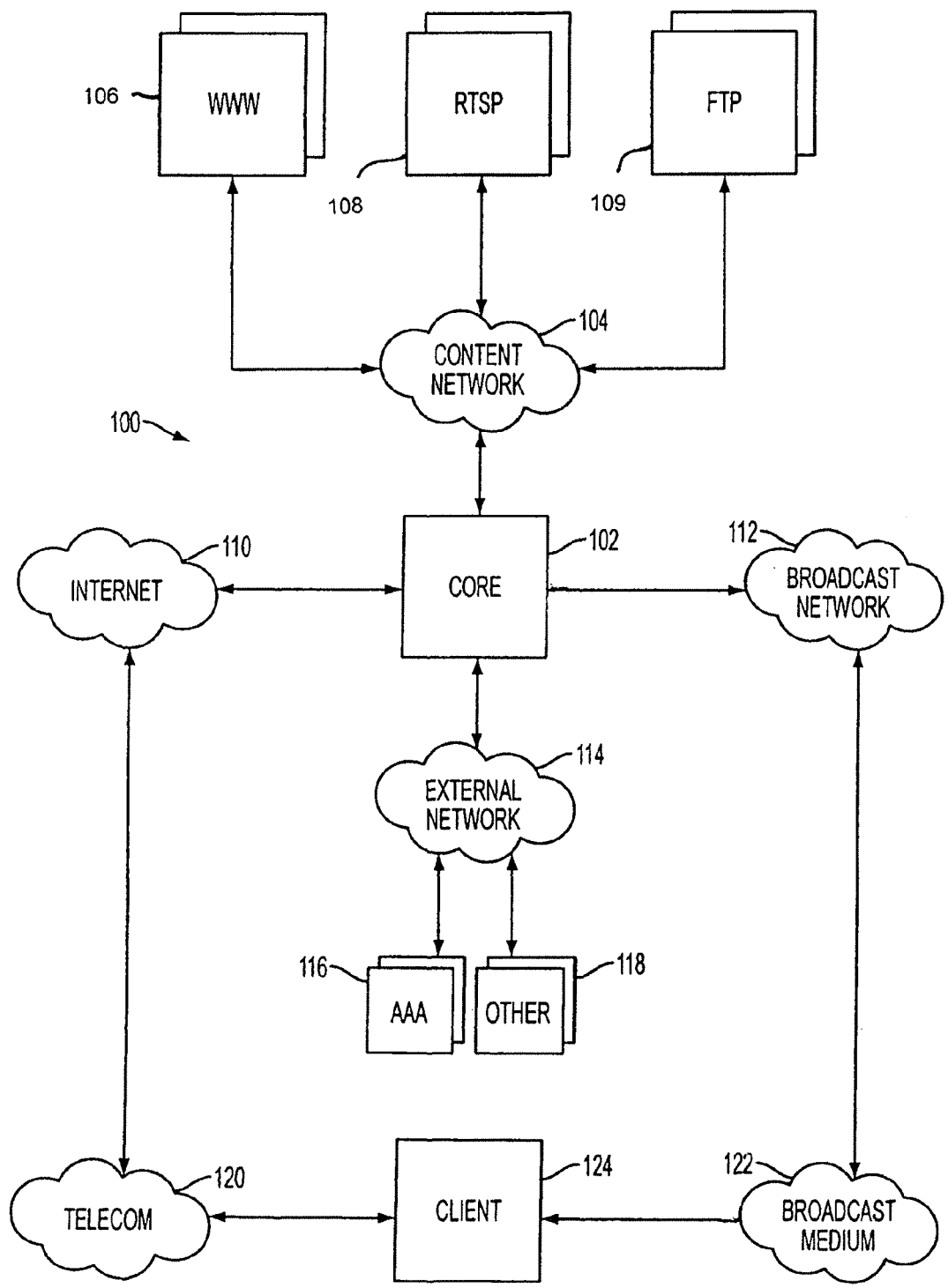
FIG. 1 is a conceptual block diagram of an example of a network for delivering content according to an embodiment of the present invention.

An embodiment of the present invention is illustrated in FIG. 1. As shown, the network 100, which can be referred to as the "MC2E platform", comprises a core 102 that communicates with a content network 104. As discussed in more detail below, the content network 104 retrieves and provides various types of data and content, such as world wide web (www) page content 106, real time streaming protocol (RTSP) content 108 and file transfer protocol (FTP) content 109, to the core 102. In this example, the core 102 operates as the platform service provider, or at least as a component of the platform service provider, and is able to fully utilize the available bandwidth of the broadcast channel and to give access to the content being provided.

The core 102 can further communicate over the Internet 110, a broadcast network 112, and an external network 114, the details of which are discussed below. For example, the external network 114 can include or communicate with one or more authentication, authorization and accounting server 116 and other devices or servers 118 as can be appreciated by one skilled in the art. As further illustrated in FIG. 1, the core 102 can thus communicate over the Internet 110 and broadcast network 112 via a telecommunications medium 120 and broadcast medium 122, respectively, with one or more clients 124. A client 124 includes, for example, the software components that run in terminal and receiver units that can be included in any type of wireless or wired mobile or stationary communication device, such as a PDA, cellular telephone, laptop computer, and so on, as can be appreciated by one skilled in the art.

Figure 2:
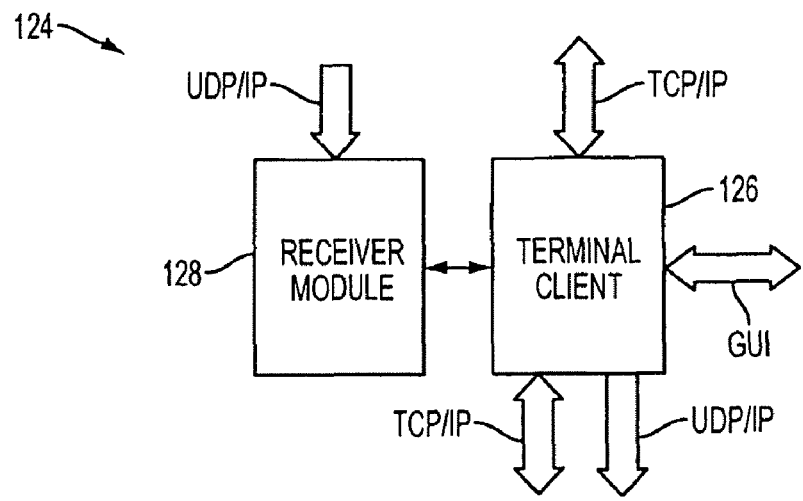
FIG. 2 is a conceptual block diagram of an example of a client employed in the network shown in FIG. 1.

FIGS. 2-11 illustrate examples of components of a client 124 according to an embodiment of the present invention. As shown in FIG. 2, a client 124 is able to efficiently handle download of content from the broadcast channel and to provide users of the terminals and receiver units with access to that content. A client 124 can be configured as two separate system modules, namely, a terminal client 126 and a receiver module 128. This exemplary division corresponds to the possible separation of software components. That is, as can be appreciated by one skilled in the art, the receiver module might 128 possibly run in a different operating system process than the terminal client 126. Also, in this example, the terminal client 126 communicates via Transmission Control Protocol/Internet Protocol (TCP/IP), User Datagram Protocol/Internet Protocol (UDP/IP) and a Graphical User Interface (GUI), while the receiver module 128 communicates via UDP/IP. Naturally, other suitable protocols can be used.

Figure 3:
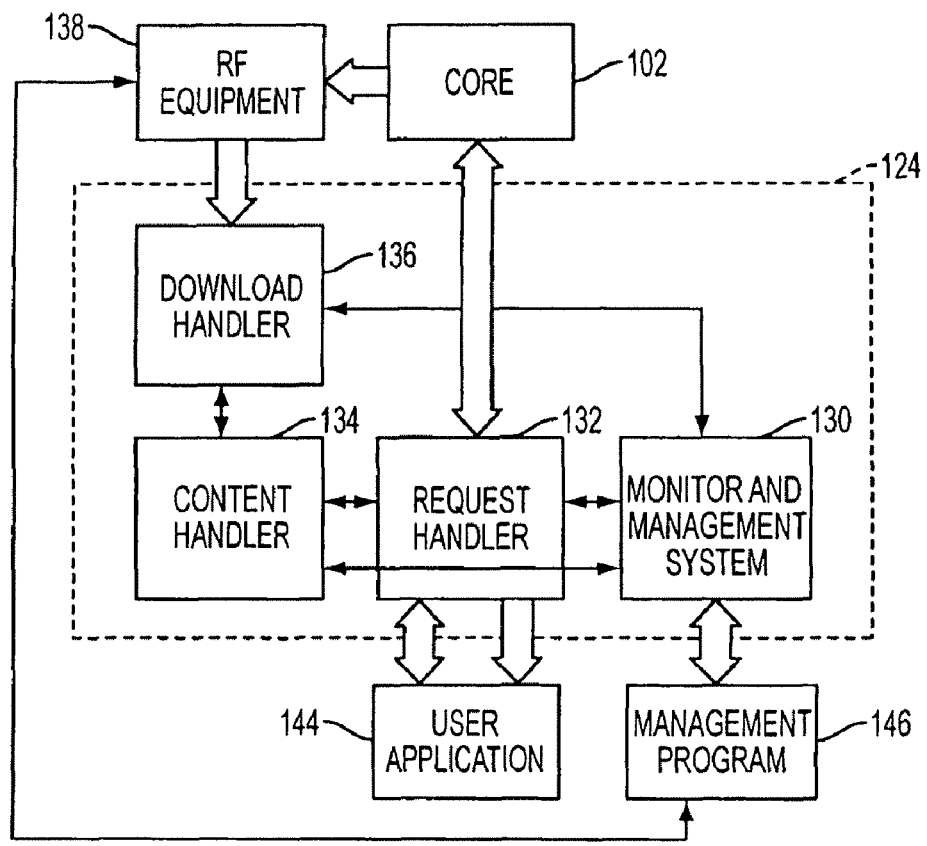
FIG. 3 is a conceptual block diagram illustrating further features of the client shown in FIG. 2.

As shown in FIG. 3, the terminal client 126 comprises a monitor and management system 130 and a request handler 132, and the receiver module 128 comprises a content handler 134 and download handler 136. According to this embodiment, the monitoring and management system 130 fetches key variables provided by the other sub-systems (e.g., the request handler 132, content handler 134 and download handler 136), and sets various properties of the client 124, such as which ports and network protocols should be supported. In this example, access to the monitoring and management system occurs via a GUI, however, any suitable access protocol can be used. The request handler 132 responds to requests for access to the sources provided by the network 100, after consulting the core 102.

The content handler 134 according to this embodiment parses, decrypts and stores content that is downloaded from the broadcast channel. The content handler 134 hides the details of the under-lying storage mechanism from other parts of the client 124. Content is served directly from the content handler 134, so that no data need be stored by the request handler 132. The download handler 136 in this example is responsible for downloading content from the broadcast channel, and interfaces with the receiver equipment 138 through IP. Hence, the download handler 136 can be independent of the particular bearer network. In this example the receiver equipment 138 (also referred to as radio frequency (RF) equipment) typically comprises an antenna, a radio receiver, and a base band unit and bearer system dependent processing software. The receiver equipment 138 is assumed to interface with the client 124 through IP, but can use any appropriate protocol as would be appreciated by one skilled in the art.

As discussed briefly above, a client 124 comprises, or is embodied in, at least one receiver unit 140 and at least one terminal unit 142. The receiver unit in this example is the physical unit (e.g., hardware) that is used to receive data from the broadcast channel, while the terminal unit 142 is the physical unit (e.g., hardware) that runs user applications 144 and a management program 146 that monitors the information (e.g. provides an event viewer) and specifies configuration parameters. The receiver unit 140 in this example includes the receiver equipment 138.

The external management program 146 provides a user of the device (e.g., a cellular telephone, PDA, laptop or the like) with an interface to control and monitor the client 124. The external program will typically have a graphical user interface (GUI). Alarms that are generated are displayed in a clear and non-ambiguous way. Controls for the various subsystems of the client 124 as discussed below can also be provided by the management program 146. In addition, the management program 146 can provide control of the receiver equipment 138 (e.g., which channel on which to listen) through a vendor-specific extension. The interface can be a graphical visualization of the platform on which alarms are visible, and the status of subsystems is obvious as well as various measurement variables (e.g., through put and load operations).

Figure 4:
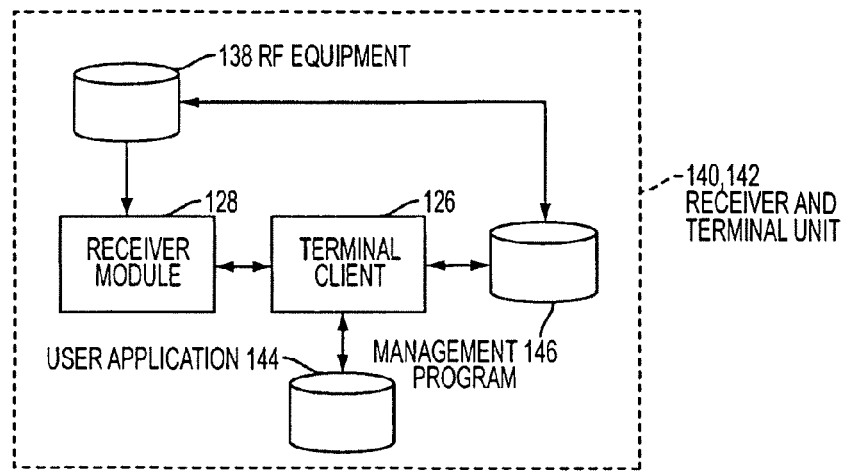
FIG. 4 is a conceptual block diagram illustrating one exemplary configuration of hardware employing the client shown in FIG. 2.
Figure 5:
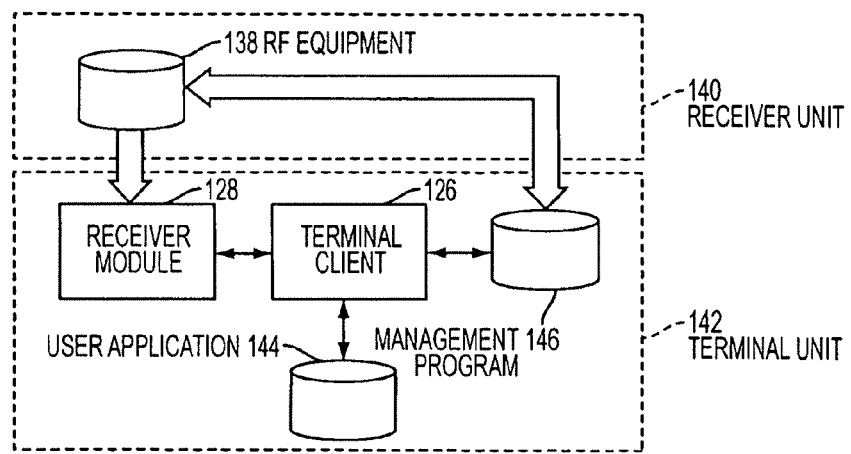
FIG. 5 is a conceptual block diagram illustrating another exemplary configuration of hardware employing the client shown in FIG. 2.
Figure 6:
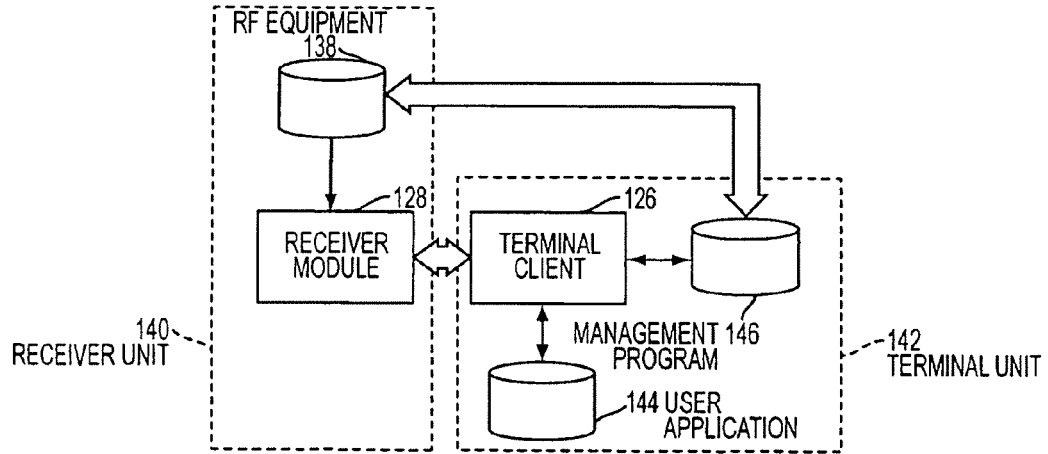
FIG. 6 is a conceptual block diagram illustrating a further exemplary configuration of hardware employing the client shown in FIG. 2.

FIGS. 4-6 illustrate three different exemplary configurations of a client 124. As shown in FIG. 4, the receiver unit 140 and terminal unit 142 are configured as the same unit. The receiver equipment 138 is installed in the same hardware that runs the software of the client 124. In the example of FIG. 5, the receiver unit 140 and terminal unit 142 are two separate hardware modules. The receiver unit 140 in this example communicates directly to the receiver equipment 138, and both the terminal client 126 and receiver module 128 are running in the terminal unit 142. In the example of FIG. 6, the receiver unit 140 includes the receiver equipment 138 and the receiver module 128. The terminal unit 142 is physically detached from the receiver unit 140. Interaction between the subsystems of the client 124 takes place over a communication link (e.g., Bluetooth, USB, and so on).

In each of the three examples shown in FIGS. 4-6, the terminal client 126 does not store content since all requested files are streamed directly to the user. The receiver module 128 running in the receiver unit 140 is assumed to have access to its own storage memory, which means that little or no memory in the terminal unit 142 will be used by the client 124. However, when the receiver module 128 runs in the terminal unit 142 (e.g., FIG. 5), a portion of the terminal unit's memory is allocated for the storage of download content. In either case, memory management is under the control of the receiver module 128, so there is no difference in the architecture for the two examples.

Further details of the content handler 134, download handler 136, request handler 132, and monitor and management system 130 will now be described.

Figure 7:
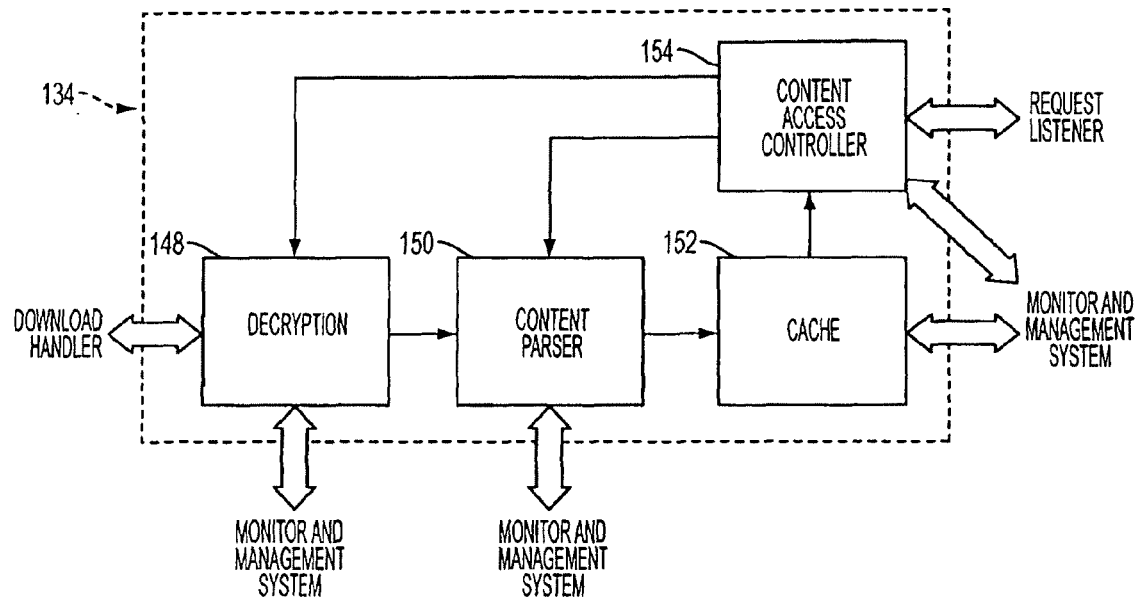
FIG. 7 is a conceptual block diagram illustrating further features of the content handler employed in the client shown in FIG. 2.

As shown in FIG. 7, the content handler 134 includes a decryption module 148, content parser 150, cache 152 and content access controller 154. The content handler 134 accepts requests for content from the request handler 132. If the content exists in the cache 152 and it still is valid, the content will be served directly. Otherwise, the request handler 132 supplies the content handler 134 with information to locate the content on the broadcast channel (e.g., an IP address or DSM-CC identifier of the content) in addition to the necessary key for decryption. Channel information is passed onto the download handler 136, which in turn opens a stream of corresponding packets that are fed to the content handler 134.

As can be further appreciated by one skilled in the art, the content handler 134 can communicate using a DSM-CC over IP transport protocol, which can be an adaptation of the DSM-CC framework. The DSM-CC over IP transport protocol is derived from the DSM-CC specifications for the DVB-T implementations. The substantive change in the protocol is the substitution of the MPEG-2 network layer with IP.

Figure 20:
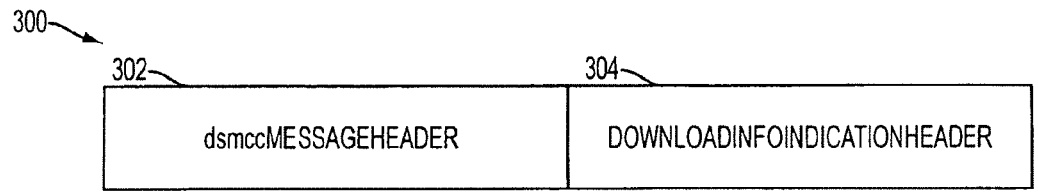
FIG. 20 is a diagram illustrating an exemplary configuration of a message used by the network shown in FIG. 1.

The protocol includes three main parts, a data module which is encapsulated in blocks named DownloadDataBlocks (DDB). An index into what modules are about to be transmitted is given by the DownloadInfoIndication (DII) message 300 as shown in FIG. 20.

At the beginning of the DII message 300 is a dsmccMessageHeader 302. This header gives a mechanism to differentiate between the DII and DDB messages. The DII message 300 also includes a DownloadInfoIndicationHeader 304. The DownloadInfoIndication (DII) message 300 contains a list of all modules about to be broadcast.

Figure 21:
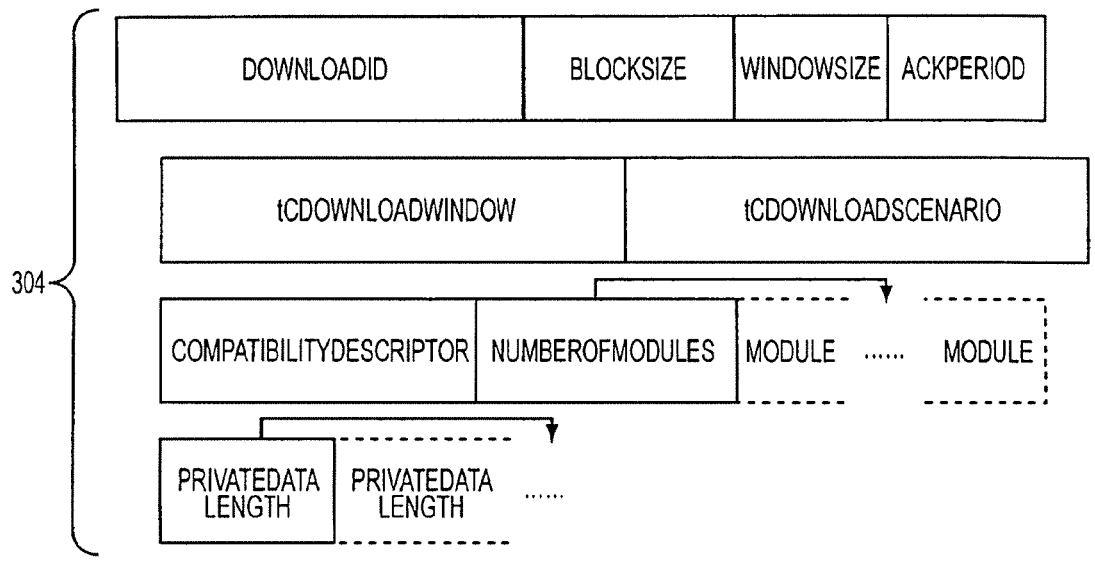
FIG. 21 is a diagram illustrating an example of further details of a field of the message shown in FIG. 20.

As shown in FIG. 21, DownloadInfoIndicationHeader 304 includes a download ID for the DII that is the same download ID as on the DDBs containing these modules. A size is given for the data of the DDBs, and all modules within a DII have the same block size. A timeout is given for the scenario, this is interpreted to mean all modules contained in this DII. After this timeout the download ID is invalid for this DII. Each module is given an ID, version and size. Extra space is provided for higher level protocols to attach relevant information to each module. Extra space is also provided for higher level protocols to attach information to the DII. Several of the other fields are not used and are given default values.

Figure 22:
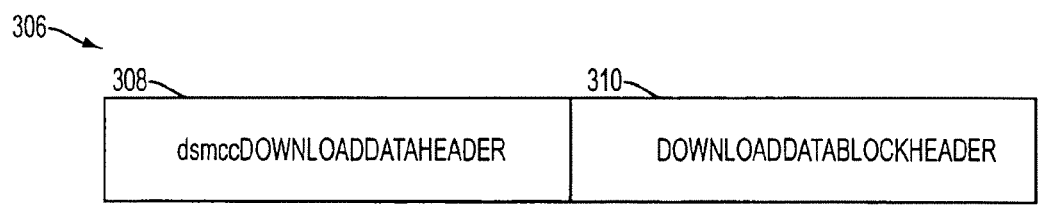
FIG. 22 is a diagram illustrating an exemplary configuration of a message used by the network shown in FIG. 1.
Figure 23:
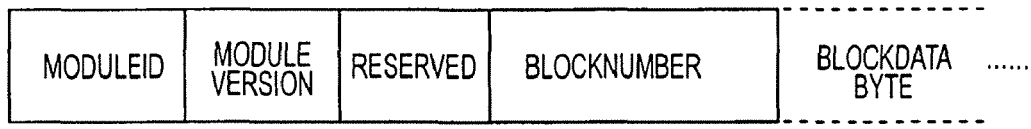
FIG. 23 is a diagram illustrating an example of further details of a field of the message shown in FIG. 22.

DownloadDataBlock (DDB) 306, as shown in FIG. 22, encapsulates a fragment of a data module. The directory and attached information for the DDBs is given via a DII. The header starts with a dsmccDownloadDataHeader 308 that contains a download ID and a method for differentiating between DDBs and DIIs. The download ID matches the download ID of a DII describing this module. This DDB 306 also includes a DownloadDataBlockHeader 310 as shown in more detail in FIG. 23, and is received within the scenario timeout of the DII describing it to be valid.

Figure 24:
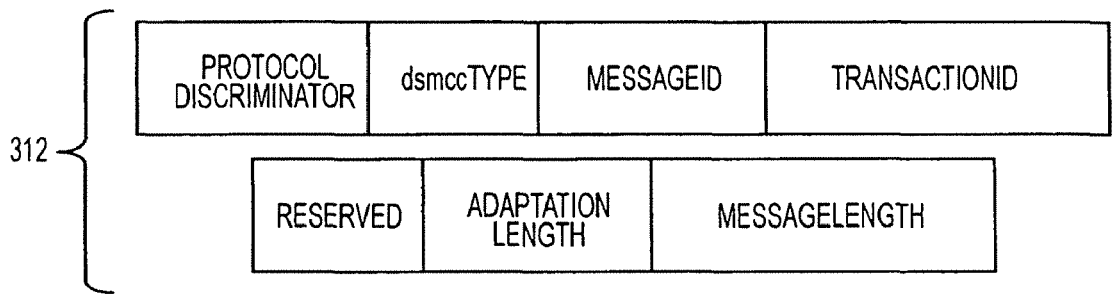
FIG. 24 is a diagram illustrating an exemplary configuration of a message used by the network shown in FIG. 1.
Figure 25:
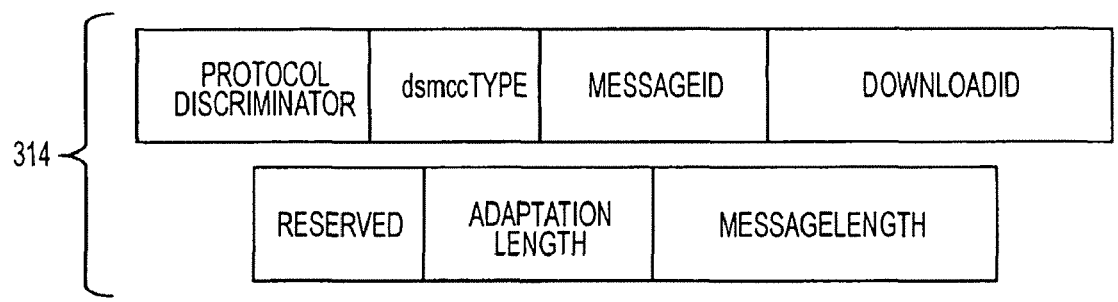
FIG. 25 is a diagram illustrating an exemplary configuration of a message used by the network shown in FIG. 1.

The dsmccMessageHeader 312 and dsmccDownloadDataHeader 314 shown in FIGS. 24 and 25, respectively. These headers describe what kind of message follows through the message ID field. A length of the following information is also given in the message Length field. The difference between the dsmccMessageHeader 312 and the dsmccDownloadDataHeader 314 is that the transaction ID in the former becomes a downloadID in the latter.

The primary use of this transport protocol is as a carousel, which implies that the same data is transmitted several times with little or no modification. If a module is updated the module version field is advanced for that particular module. This allows receivers who may have gotten apart of a previous cycle to flush their buffers to start again, and also stops modules being received again if no modification has been made (power savings).

A set of modules (one or more) is being prepared for transmission a DII is typically generated first. This will include a download ID unique to this transaction ID for at least the timeout of the scenario. For each module there is generated a module ID unique within the download ID. Also for each module a version is given, size and any attached data from a higher level protocol is appended. A block size is determined for all modules and given in this header. Attached data from a higher level protocol is appended to the DII, and the DII is sent first.

As the DII has been sent, all DDB for that DII follow (not necessarily in the correct order nor alone). Each DDB has the same downloadID as specified in the DII, all DDBs are numbered within a module and carry a moduleID. All DDBs are received within the scenario timeout to be valid.

In addition, a simple file transfer is an extremely low overhead way of moving files over DSM CC. The files are transmitted in DDB, without any error checking (e.g., UDP checksums should guarantee error detection). The file is fragmented into the data field of DDBs, with the correct block size. A DII is generated for all files to be transferred, moduleIDs verified against the DDBs. The DII contains the file size and in the module Info field the full, absolute pathname is given. In this example, the field is limited to 256 characters, but can be any suitable number.

Turning back to FIG. 7, the DSM-CC header of each packet is decrypted by the decryption module 148, and the packet is then passed on to the content parser 150. The content parser 150 extracts content from the DSM-CC encoded packets and thus gives meaning to the packet payload in the context of DSM-CC. That is, packets are arranged in the correct order and each module is flushed to the cache 152 when completed. Once a complete download has taken place, the content handler 134 responds with the content originally requested to the request handler 132. The content access controller 154 manages the download process discussed above, and provides the request handler 132 with a "virtual" carousel interface as discussed in more detail below. The cache 152 stores data from the broadcast carousel. If the storage space is limited, the cache 152 prioritizes the available space according to request statistics and, possibly, user-specified rules. In addition, as can be appreciated by one skilled in the art, the content handler 134 can communicate with the download handler 136 via function calls, and can communicate with the request handler 132 either via function calls or over a specific type of communication link (e.g. Bluetooth, IP, USB).

Figure 8:
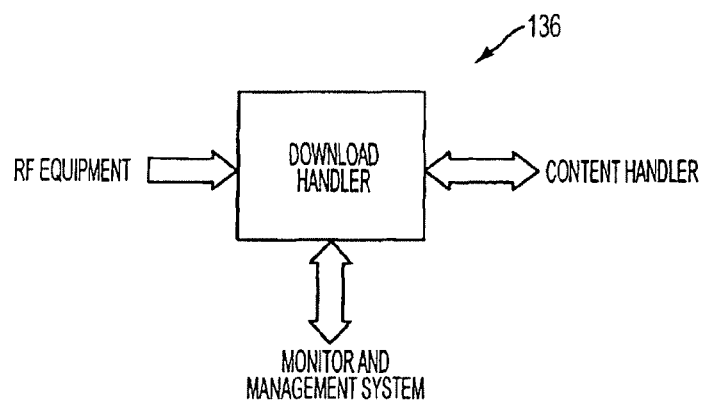
FIG. 8 is a conceptual block diagram illustrating further features of the download handler employed in the client shown in FIG. 2.

As shown in FIG. 8, the download handler 136 serves the content handler 134 with a stream of requested data packets. The content handler 134 specifies the IP address/MPLS label for which the download handler 136 should listen to receive. The download handler 138 can interface with the receiver equipment 138 via IP (e.g., UDP), which makes it independent of the particular bearer system and receiver hardware/software being used. The download handler 136 can be embodied in a single component, and also can access information from the content handler 134 via function calls or in any other suitable manner.

Figure 9:
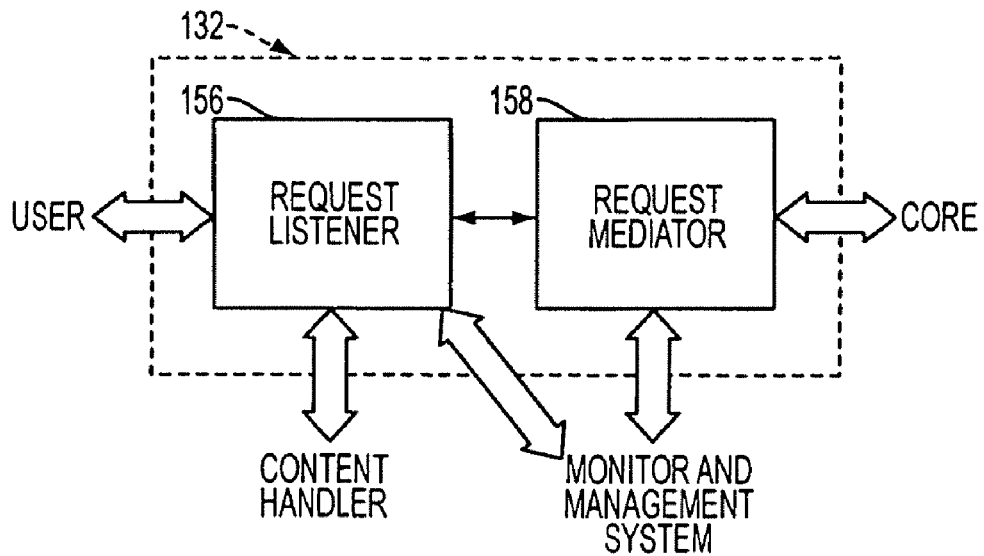
FIG. 9 is a conceptual block diagram illustrating further features of the request handler employed in the client shown in FIG. 2.

FIG. 9 illustrates an example of the components of the request handler 132, which provides user applications with a network interface to the services of the core 102. As indicated, the request handler includes a request listener 156 and a request mediator 158. The request listener 156 listens for and parses incoming requests, communicates with the core 102 via the request mediator 158 and forwards request information to the content handler 134. The request mediator 158 in this example communications with the core 102 in accordance with the UCP protocol.

For each client request, the request handler 132 determines whether the requested content is contained within the content handler 134 or if the request should be forwarded to the core 102. In the latter case, the core 102 responds with information that is used to identify the content on the broadcast channel. The request handler 132 passes this information on to the content handler 134. Once the content handler 134 contains the content, either from a previous download or a download that was triggered by the current request, the request handler 132 opens a data stream from the content handler 134 and writes the data out to the client 124. The request handler 132 can communicate with the core 102 via IP or any other suitable protocol, and can communicate with the content handler 134 via either process calls (e.g., to the internal receiver module 128) or over a specific type of communication link (e.g., Bluetooth, IP, USB and so on).

Figure 10:
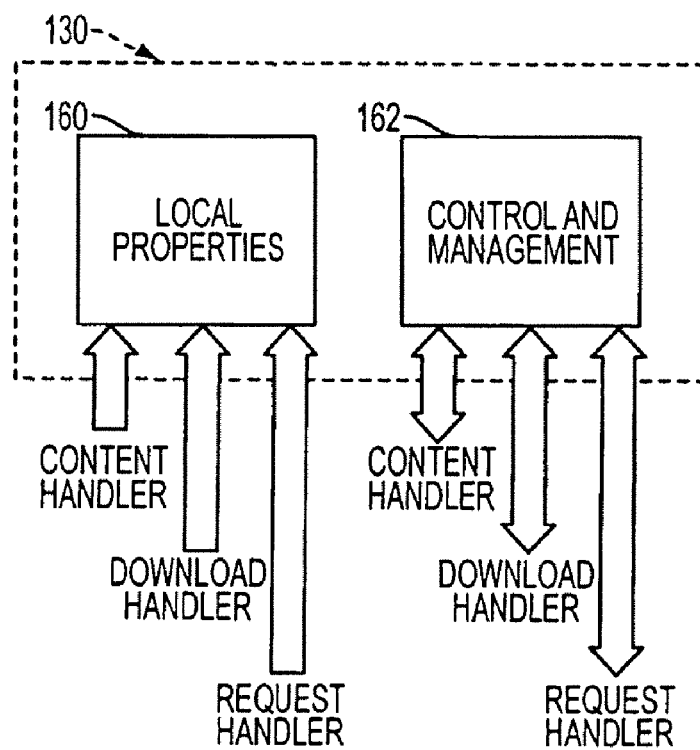
FIG. 10 is a conceptual block diagram illustrating further features of the monitor and management system employed in the client shown in FIG. 2.

As shown in FIG. 10, the monitor and management system 130 includes a local properties module 160 and a control and management module 162. The monitor and management system 130 configures and fetches information from other subsystems. This functionality is exposed through an interface to an external management program 146. The local properties module 160 provides access to persistent properties, and the monitor and control management module 162 logs selected system variables and the control of other subsystems. The monitor and management system 130 in this example can communicate with the content handler 134 either through function calls or over a specific type of communication link (e.g., Bluetooth, IP, USB and so on), and can communicate with the download handler 136 either through function calls or over a specific type of communication link. Also, the monitor and management system 130 can communicate with the request handler 132 via, for example, function calls.

Figure 11:
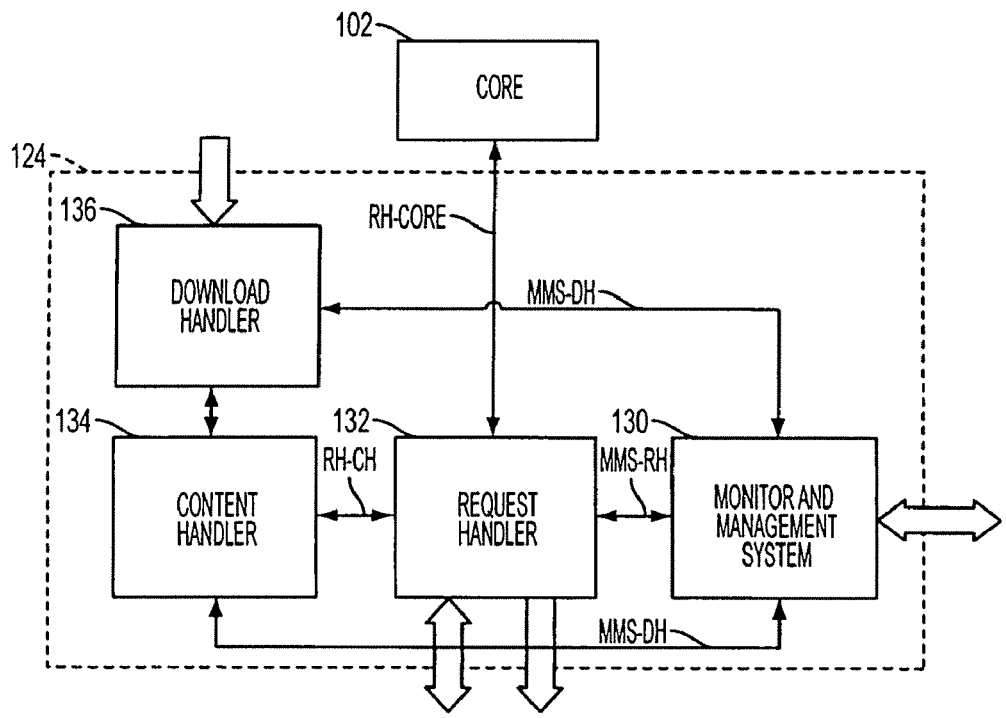
FIG. 11 is a conceptual block diagram illustrating an example of connectivity between the components of a client and the core as employed in the network as shown in FIG. 1.

FIG. 11 illustrates further details of the subsystems of the client 124 as discussed above, as well as an example of communications between client subsystems, and between the client 124 and the core 102. The interfaces are designated as RH-Core which is between the request handler (RH) 132 and the core 102, RH-CH which is between the request handler (RH) 132 and the content handler (CH) 134, MMS-CH which is between the monitor and management system (MMS) 130 and the content handler (CH) 134, MMS-DH which is between the monitor and management system (MMS) 130 and the download handler (DH) 136, and MMS-RH which is between the monitor and management system (MMS) 130 and the request handler (RH) 132. It should be noted that all of the interfaces described above are possibly between remote entities.

The RH-Core interface can include a UCP (Uplink Communication Protocol), and enables a client 102 to request content from the core 102. An example of UCP will now be described.

Figure 12:
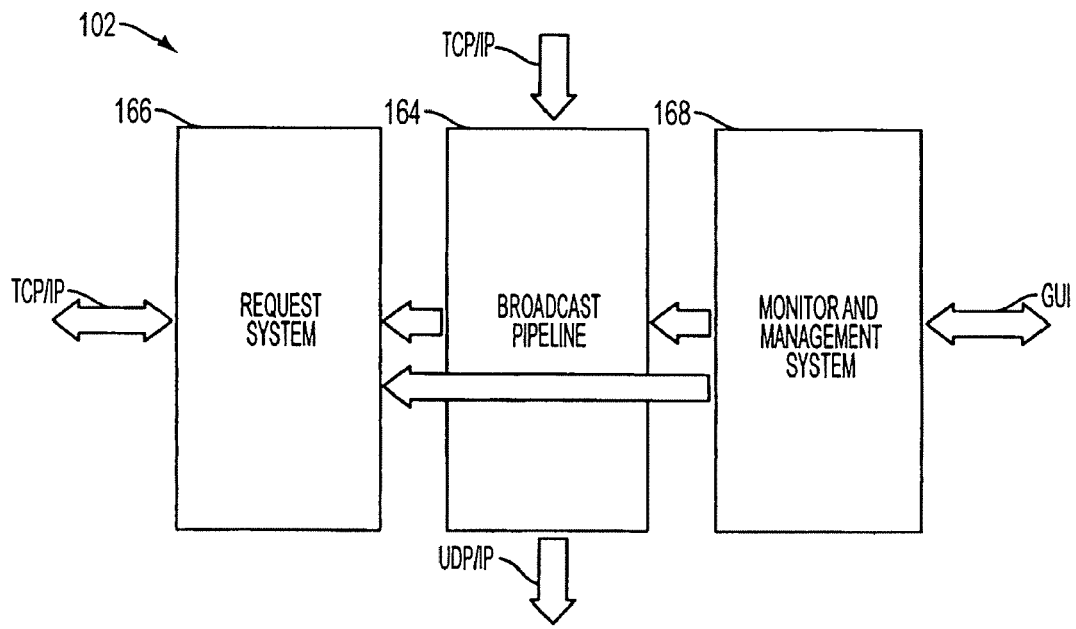
FIG. 12 is a conceptual block diagram illustrating further features of the core employed in the network shown in FIG. 1.

The UCP can be used in communication between the client 124 and the core request system 166 (see FIG. 12). As can be appreciated by one skilled in the art, UCP is a session protocol that provides a structure for "conversation" between two parties. UCP follows a binary packet-based client/server request-response model, which is quite compact and requires a small amount of code to implement.

UCP is the basic structure of conversation between the client 124 and the core request system 166. UCP includes a format for the conversation between devices and a set of opcodes that define specific actions. UCP follows a client/server request-response paradigm for the conversation format. The terms client and server refer to the originator (client) and receiver (core) of the UCP connection. In UCP, all sessions are initiated by the client.

Figure 26:
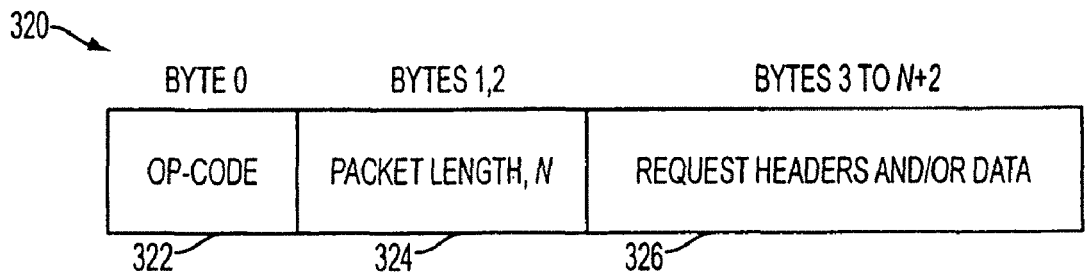
FIG. 26 is a diagram illustrating an exemplary configuration of a message used by the network shown in FIG. 1.

Each UCP request includes an epode, a request length, and one or more headers. A header entirely fits within a packet and is not be split over multiple packets. FIG. 26 illustrates an example of the UCP request format 320. The op-code 322 is one byte and the packet length 324 is represented by two bytes (maximum packet length is therefore 64K−1 bytes), with the most significant byte first. The packet length equals the number of bytes that should be read after the first three bytes, that is the data section 326.

The op-code specifies the operation that the client wants to perform. Table 1 lists an example of the op-codes that are defined in UCP and specifies which headers are mandatory for each code. Also listed in the Table 1 are optional headers for each op-code, within brackets, that have special meaning within the context of the corresponding op-code. It is assumed, although not necessary, that the headers are in the order which is presented in the table, when a request is made.

TABLE 1

| Op-code | Value | Headers in order | Description |
| --- | --- | --- | --- |
| GET | 0x01 | NAME [USER_NAME] [PASSWORD] | Request for a specific resource. A GET request is followed by a NAME header that specifies the name of the requested resource. If the system expects the user to authenticate before each request, the user name and password is included next. Other headers may appear in any order thereafter. |

Figure 27:
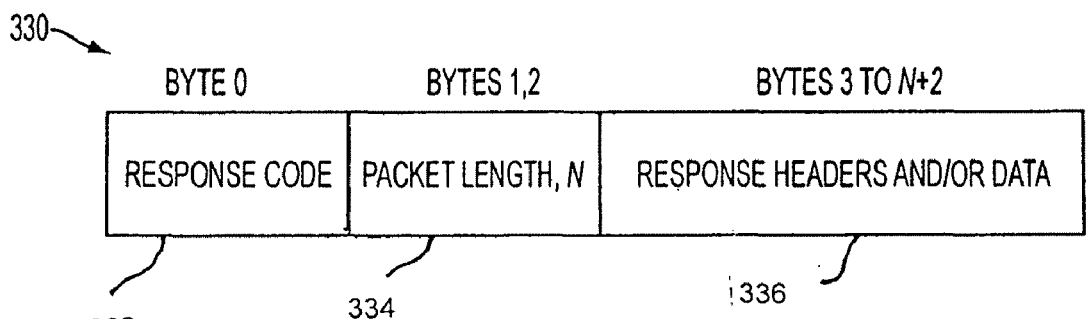
FIG. 27 is a diagram illustrating an exemplary configuration of a message used by the network shown in FIG. 1.

A UCP response includes a response code, a number that denotes the packet length and, optionally, one or more headers. FIG. 27 illustrates an example of the format of a response 330. The response code 332 is one byte and packet length is represented with a two byte number 334, in the same manner as for requests. The response 330 further includes a data section 336.

The response code 332 indicates the status of the request previously issued by the client. Table 2 below lists an example of the response codes defined for UCP using the same setup as used for Table 1.

TABLE 2

| Op-code | Value | Headers in order | Description |
| --- | --- | --- | --- |
| SUCCESS | 0x20 | TRANSACTION_ID ENCRYPTION_KEY IP_ADDRESS [LENGTH] [NAME] | This request was handled without problems. A SUCCESS code is followed by a TRANSACTION_ID header, which stores the identifier for the broadcast stream containing the requested resource. Next there should be an ENCRYPTION_KEY header, containing the key used for decryption, followed by an IP_ADDRESS header, which specifies the IP address that the client should listen for. The server can also include the size of the resource, in bytes, by sending a LENGTH header. The server can also indicate to the client that the name resource that was requested should hereafter |

TABLE 2-continued

| Op-code | Value | Headers in order | Description |
|---|---|---|---|
| | | | be referred to with a new name. This can happen, for example, if the client requests a general content category, such "/news", instead of a specific file within that category. To rename the resource in this manner, the server attaches a NAME with the new name included. |
| BAD_REQUEST | 0X40 | | The request was not formatted according to UCP. |
| UNAUTHORIZED | 0x41 | | The client does not have permission to perform the operation it requested. This usually happens when either the client requested a resource it does not have access to or if the necessary credentials were missing from the request. |
| NOT_FOUND | 0x43 | | A named resource was not located with the server. |

Figure 28:
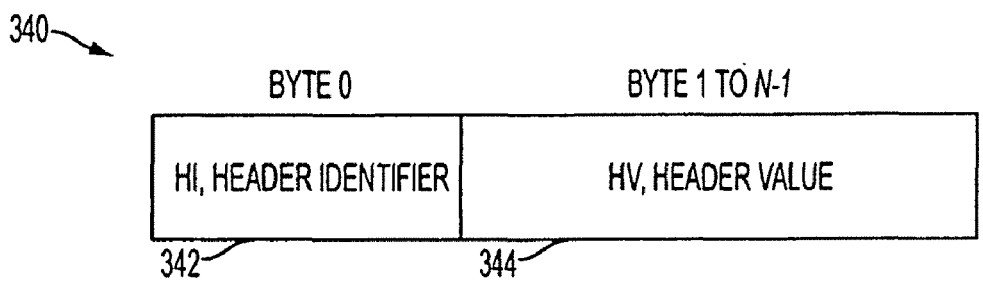
FIG. 28 is a diagram illustrating an exemplary configuration of a message used by the network shown in FIG. 1.

As discussed above, the UCP header 340, as shown in FIG. 28, contains data that provide certain information when put into perspective with the operation in question. The same type of header can have different meaning when used with different operations. For example, a NAME header that follows a GET operation contains the name of a requested resource, while a NAME header that follows a SUCCESS response means that a named resource should be referred to with new name value.

HI, the header ID 342, is an unsigned one-byte quantity that identifies what the header contains and how it is formatted. HV 344 includes one or more bytes in the format and meaning specified by HI. All headers are optional, depending on the nature of the transaction, one may use all of the headers, some, or none at all. IDs make headers parseable and order independent, and allow unrecognized headers to be skipped easily. Unrecognized headers should be skipped by the receiving device.

The low order 6 bits of the header identifier are used to indicate the meaning of the header, while the upper 2 bits are used to indicate the header encoding. This encoding provides a way to interpret unrecognized headers just well enough to discard them cleanly. The length prefixed header encodings send the length in network byte order, and the length includes the 3 bytes of the identifier and length.

An example of the 2 high order bits of HI are illustrated in Table 3 below.

TABLE 3

| Bits 8 and 7 of HI | Interpretation |
|---|---|
| 00 | Unicode (UTF-16) text (each character is two bytes), length prefixed with 2 byte unsigned integer |
| 01 | Byte sequence, length prefixed with 2 byte unsigned integer. |
| 10 | One byte quantity. |
| 11 | Four byte quantity, transmitted in network byte order (high byte first). |

As stated, Table 3 lists the headers that are defined for UCP. The table includes the coding of each header in both binary and octal form. The header identifiers are numbered in order, starting with zero. The high order bits which specify the encoding obscure this linear sequence of header numbering. In this example, all 8 bits of each header are needed for identification, that is, two headers that use different encoding could have the same value of the 6 least significant bits.

Table 4 below also lists examples of the header identifiers.

TABLE 4

| Identifier (HI) | | | |
|---|---|---|---|
| Hex | Binary | Name | Description |
| 0x01 | 00 000001 | NAME | Name of the resource (often a file name). |
| 0x05 | 00 000101 | USER_NAME | User name, used for authentication |
| 0x06 | 00 000110 | PASSWORD | Password matching the user name, used for authentication. |
| 0xC1 | 11 000001 | IP_ADDRESS | IP address to listen for. |
| 0xC2 | 11 000010 | LENGTH | The size of the resource in bytes. |
| 0xC3 | 11 000011 | TRANSACTION_ID | Identifier of the broadcast containing the requested resource. |
| 0x44 | 01 00100 | ENCRYPTION_KEY | Key to encrypted content. |

Further details of an example of communication between the core 102 and client 124 will now be described. The client 124 can issue a request for a particular content, including a fully-qualified path name of the requested content, that is, a URI within a specified context, and user credentials (e.g., login name and password). The core 102 can determine whether the request is valid by, for example, checking if the requested content exists and if the user has the credentials to access that content. If not, the core 102 responds with an appropriate error message. Otherwise, the core 102 responds with a valid content identifier and a key for decryption. A return value that indicates the status of the request (e.g., successful, rejected, etc.). If the request is successful, the core 102 also responds with a content identifier (e.g., IP address that the Client should listen to) and a key that should be used to decrypt the downloaded data.

The RH-CH interface can enable the request handler 132 to request content from the content handler 134. That is, the request handler 132 issues a request for a fully-qualified path name for a particular content. The content handler 134 determines whether or not the content exists. A return value that indicates whether or not the requested content exists, and the content handler 134 returns an open data stream to the content if the request is successful. If the content handler 134 does not contain requested content, the request handler 132 should be able to start a new download. To do this, the request handler 132 issues a request for a download by specifying the name of the content requested from the download, a download identifier (e.g. IP address), and a key for decrypting incoming packages. The content handler 134 can then start a new download. In particular, a return value that indicates whether or not the download succeeded. Following a successful download, the content handler 134 returns a data stream to the requested content.

The MMS-CH interface enables a user to specify the size and location of the content cache. For example, the user can specify the cache parameters (e.g., through the user interface of the external management program 146). The content handler 134 sets up the cache according to the specified parameters. The monitor and management system 130 listens for information on the status of the content handler 134. That information includes, for example, an amount of cache currently in use. The monitor and management system 130 requests information from the content handler 134 at regular intervals, and the content handler 130 gathers and outputs the requested information if available. The content handler 130 also alerts the monitor and management system 130 with an alarm if an exception occurs. Possible exceptions include an I/O exception indicating that a problem occurs when writing to the cache. If an exception occurs, the content handler 134 sends a corresponding message to the monitor and management system 134, which notes the exception and sets appropriate status flags (e.g., notification to the external management program 146).

The MMS-DH interface enables the monitor and management system 130 to listen for information on the status of the download handler 136. The information provided can include, for example, mean throughput rate of input stream. The monitor and management system 130 requests information from the download handler 136 at regular intervals. The download handler 136 gathers and outputs the requested information if available. The download handler 136 also alerts the monitor and management system 130 if an exception occurs, which can be a network exception where the download handler 136 is unable to bind to a specified network address. If an exception occurs, the download handler 136 sends a corresponding message to the monitor and management system 130, which notes the exception and sets appropriate status flags (e.g., notification to the external management program 146).

Figure 13:
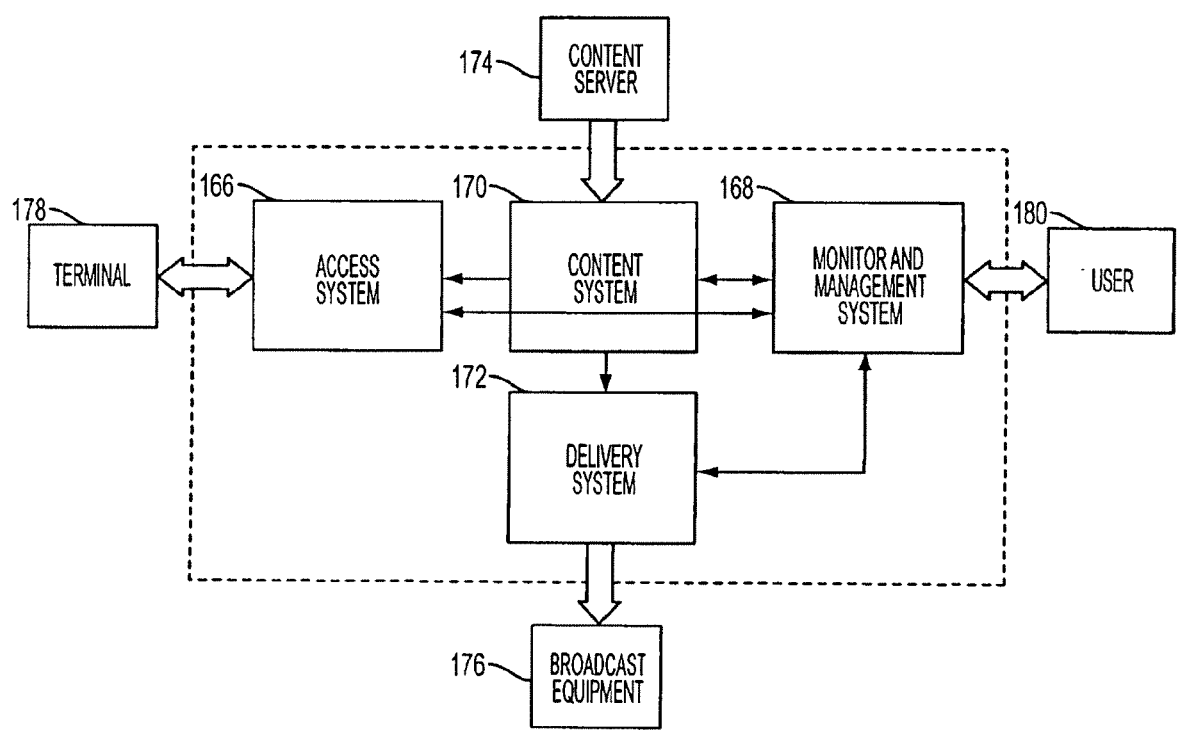
FIG. 13 is a conceptual block diagram illustrating further features of the core shown in FIG. 12.

Details of the core 102 will now be discussed with regard to FIGS. 12-19. As discussed above, the core 102 operates to fully utilize the available bandwidth for the broadcast of content and to provide clients 124 with access to that content. As illustrated in FIG. 12, the core 102 according to an embodiment of the present invention includes a broadcast pipeline 164 (fed, for example, via the carousel), a request system 166 (also referred to as an access system 166 in FIG. 13) and a monitor and management system 168. The broadcast pipeline is then further divided into a content system 170 and delivery system 172 as shown in FIG. 13.

In this example, the content system 170 fetches data from a content server 174 in the content network 104 (see FIG. 1) and prepares data which is offered to the users. Regular updates of the content are governed by configuration files. Data for transmission is generated according to a schedule. The content system 170 also handles encryption of data.

The delivery system 172 delivers data to the broadcast equipment 176 which can be included in the broadcast network 112 (see FIG. 1). The request (access) system 166 responds to requests for access to the system after consulting, for example, an external AAA system 116 (see FIGS. 1 and 14), and also communicates with a terminal 178 in FIG. 13. Information for access to the systems is stored locally in this request system 166 to facilitate scalability.

Monitoring and management system 168 fetches key variables provided by the other sub-systems, exposing them to external management software (e.g., operational management software), and also provides an interface to control messages for external management software (e.g., operational management and the editorial system). The monitor and management system 168 can also communicate with a user 180.

In this example, a core system external management interface can provide remote, external software with an interface to control and monitor the MC2E Platform. The external management software in this example has two sets of functionality which may be implemented in separate programs, namely, an editorial system and an operations management.

The editorial system generates schedules for the MC2E Platform and sends them to the platform. This software should help the content provider to maintain an optimal carousel with respect to download time, latency and content. The carousel (discussed below) can be a hierarchical collection of categories, which may be of different sizes and have different transmission intervals. The editorial system can also show to the user estimated size of each category, along with worst case and typical case latency and download time.

The operations management system can be used by the platform operator to maintain a working system. All alarms generated are displayed here in a clear and non-ambiguous way. Controls of the various subsystems can be exposed to the platform operator here, except for, for example, the schedule updates which are handled by the editorial system. The interface can be a graphical visualization of the platform on which alarms are visible, status of subsystems is obvious as well as various measurement variables (throughput and load operations).

Figure 14:
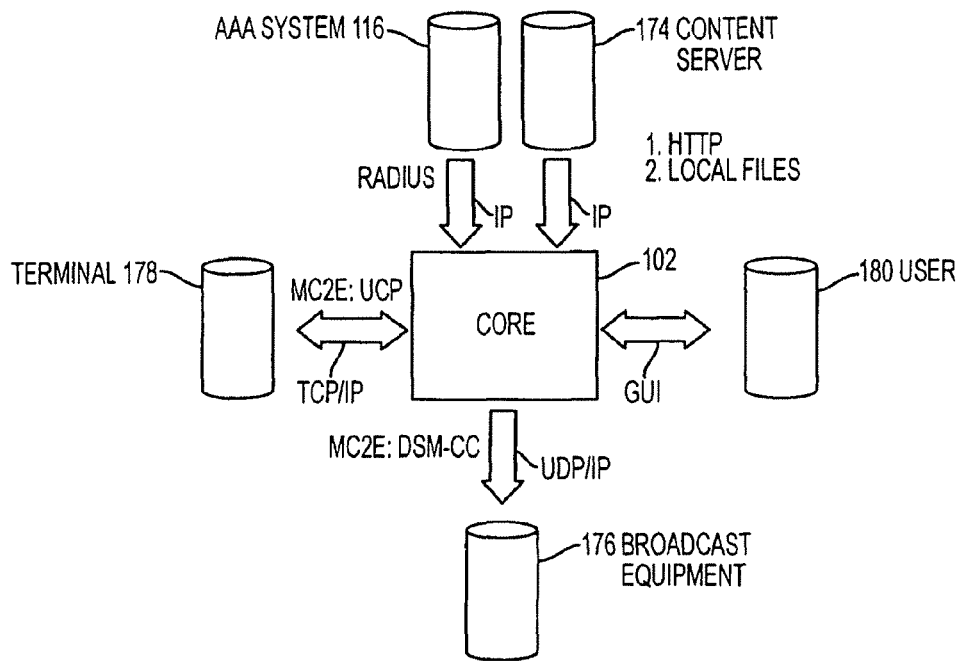
FIG. 14 is a conceptual block diagram illustrating an example of connectivity between the components of the core and other components of the network as shown in FIG. 1.

The configuration of the core 102 discussed above separates the subsystems as much as possible and reduce intersystem traffic to make the system scalable. In this way, different subsystems may be separated as well as spread across different servers. FIG. 14 illustrates an example of subsystem interfaces. The subsystem interfaces are configured to maintain low traffic densities between subsystems, with high traffic links being in single subsystems, except in the broadcast pipeline, which by definition is a sequence of subsystems connected by heavy traffic links. The subsystem interfaces also provide for scaling, and each subsystem may be separated onto its own server, or distributed onto several servers (e.g., the request system 166 and delivery system 172 can be distributed onto several servers).

Figure 15:
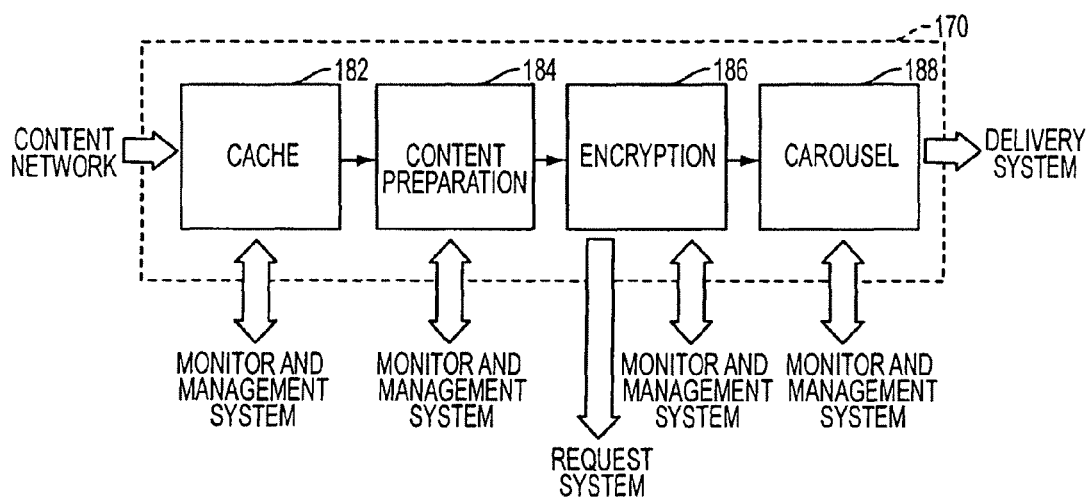
FIG. 15 is a conceptual block diagram illustrating further features of the content system employed in the core shown in FIG. 12.

Further details of the content system 170 are shown in FIG. 15. As indicated, the content system 170 includes a cache 182 that fetches and stores content data from the content network, a content preparation module 184 that prepares the content data for transmission in line with DSM-CC, an encryption module 186 that handles encryption of the DSM-CC headers, and a carousel module 188 that handles mixing of categories with the correct frequency into an output stream.

The encryption module 186 operates to achieve access control, to enable authorized users to access content on the platform while rendering all communications useless to non-authorized users. The encryption module 186 encrypts the DSM-CC header of packets that pass through it using an encryption algorithm and encryption keys. Each key is mapped to the content category from where the data in the packet comes. The header of each packet is encrypted by that key. The encryption module also generates the encryption keys and changes them periodically.

The encryption module 186 in this example has two tables, a table of content categories and a table of encryption keys, with fixed correspondence between the positions in these tables. The key table is changed periodically but the correspondence between positions in the two tables does not change. These two tables are referred to jointly as the key-category table. The key-category table is known to the request system 166. When a request comes from a client's terminal for a given content category, the key corresponding to the subject category requested is enclosed in the response message. The request message travels from the request system 166 down the request channel to the terminal and becomes the access key (decryption key) for the client 124.

The valid category table (a listing of the content categories in the carousel) is known at any given time. Statistically independent keys are generated and the two tables are fused into a key-category table, which is loaded into the module on initialization. Packets arrive in the encryption module along with information about the content category to which they belong. Matching that information in each case with the corresponding category in the key-category table, the packet header is encrypted with the corresponding key and the encryption function. The packets are then forwarded to the carousel scheduler. All request handlers (which can be many and remote) serving the broadcast pipeline are kept informed of the current key-category table at all times.

New keys can be generated locally in the encryption module; simply by XOR-ing bitwise an existing key with a random "seed" number of the same bit length. The keys are random numbers (e.g., 144 bits long). This can be done "inplace" without any extra register of storage requirements. That is, the outcome bit of XOR-ing each key-bit with a seed-bit replaces the key-bit in its place. The new keys are as statistically independent as the old ones. The seed number is needed with every new key change (arbitrarily taken every 10 minutes in this example). Rather than generating a key with some congruent algorithm it can be generated with a "pseudo random number generator" (PRNG) run, for example, every 10 minutes. This light-weight encryption mechanism is easily distributable and does not require disseminating any keys or secret information. Rather, the parameter settings of the PRNG are safeguarded.

At initialization, the key-category table can be loaded onto these subsystems like in the case of the encryption module 186, and then, at least in the case of distributed remote request handlers, the new keys can be generated in each one locally with the same seed and XOR algorithm as was used in the encryption module. Then periodically when the encryption module changes the key table, it notifies the request handlers of the change by simply transmitting a trigger pulse. The key-table and the seed number need not be set to the same PRNG and parameter setting in each of the remote subsystems. In case of a MC2E platform which is scaled up to many request handlers and which are remote from the broadcast pipeline, it is not necessary to send the whole key-category table or even the new seed number. This not only reduces the communication traffic on the interface between the content system 170 and request system 166 down to a single trigger pulse, but also increases security by not having to send the new access codes over insecure communication lines. In the case of a small platform with one request handler residing on the same server as the broadcast pipeline, the upgraded key table can be sent from the encryption module 186 to the request handle; nothing stands in the way of doing that in simple cases. But in general, the above technique of distributed key generation serves scalability and security greatly in the platform.

The timing of the change of keys can be critical. The access system may not provide old keys after the new ones take effect. Otherwise the client receiving such a key will never find a "down-load" it can decrypt. This is prevented by a small guard interval from the moment of the trigger to the time the actual change takes place. At or about the time that the access system receives the trigger it will provide all requests with the new keys, but the encryption module 186 will delay using them until the guard interval has passed.

The periods can be chosen so that the following timing applies:

Guard interval 100 ms, configurable in the range 10 ms-5000 ms; and

Key change every 10 minutes, configurable in the range 1 minute-1440 minutes.

In addition, two types of DSM-CC messages can be used, DDB and DII. The header of the DDB (which is prepended to the actual data) is 18 bytes in length in this example. The DII is contained by itself in a packet which may be 64 Kbytes in length but will typically be less than 4K bytes.

The DII signals that one or more named content files will follow. The name and a download ID are contained in the DII. A stream of DDB packets will follow which contain fragments of the file, the DDB headers are used to assemble the file from the stream. The DDBs comes after the DII, but may be intermixed with other streams, and in any order.

By encrypting the DII message and DDB headers, as well as guaranteeing the mixing of the stream (both in order and among other streams), assembling the streams becomes extremely difficult.

To encrypt, a simple bitwise XOR mechanism is used. The key has a length of at least 18 bytes (144 bits) to provides efficient scrambling of the DDB headers. The key is simply XOR'ed with the plain text to produce the cipher text. If the plain text is longer than the key, the key is reused until the end of the plain text is reached.

This light-weight encryption system is suitable for streaming the data, and provides a sufficient level of protection against casual unauthorized access attempts. The encryption function (and algorithm in particular) can be substituted with a different algorithm if needed.

The content system 170 further maintains a schedule of content made available through the network 100. The schedule describes the whereabouts of the contents in the content network 104, how to access such content and the frequency of updates.

For example, as can be appreciated by one skilled in the art, the content system 170 can employ a schedule that links content files to categories, along with meta-data. First, all files and categories are defined. Schedule files can have the following properties:

Carousel content name: What should the name of the content be in the carousel 188.

These are unique within the carousel 188.

Content type: Is the content local fetched over a network connection.

Content protocol: How should the content be accessed (file, http, ftp, etc.).

Protocol content name: What is the name of the content, an URL for http, directory path for local files.

Refresh interval: How often should this content be refreshed (checked for updates) in milliseconds.

Categories can have the following properties:

Category name: Name of the category, which is unique within the carousel.

Transmission interval: Repetition rate of the category. This is the inverse of the frequency. If a category should be transmitted every carousel cycle the interval is 1, if every other cycle is the requirement then the interval is 2.

The last set of entries in the schedule is the linking of content files to the categories. This is the carousel content name for the content files and category name for the categories. An example of the format of the schedule file is as follows:

file some content .wmv file some content .wmv 86400000
category entertainment 1
categoryfile entertainment matrix.wmv The first line above defines a content file, the second a category while the third one links the category. Alternatively, a format having the same functionality but using XML can be used.

When the schedule changes the revised schedule is sent to the request system 166 along with necessary access parameters such as encryption keys. The content system 170 also stores all content described in the schedule in the cache 182 in a broadcast ready form, i.e. DSM-CC packets. The output stream can be encrypted to provide access control, keys to unlock specific categories is provided to the Request System. A stream of data is provided to the Delivery System, comprised of all the categories with correct frequency.

The content system 170 interfaces with the content network 104 through IP (e.g., HTTP, FTP and local files) or any other suitable protocol, and interfaces with the monitor and management system 168 through function calls from the content system 170. The content system 170 also interfaces with the delivery system 172 through function calls from the content system 170, and with the request system 166 through function calls from the request system 166. The content system 170 further can provide messages including, for example, information pertaining to the output stream throughput (e.g., via carousel 188), the time since last key update, the time left of current key set (e.g., encryption time), and the size of categories (e.g., content preparation), to name a few. The content system 170 can also provide alarms indicating, for example, an indication that the carousel 188 is muted, the request system not responding (e.g., an encryption problem), a category is not complete, a failure to fetch content from cache (e.g., a content preparation problem), and an indication that the content is not accessible (e.g., a content size mismatch in the cache 182 has occurred). The content system 170 can also schedule updates, mute the carousel 188, force cache reload, and start/stop/restart providing content.

Figure 16:
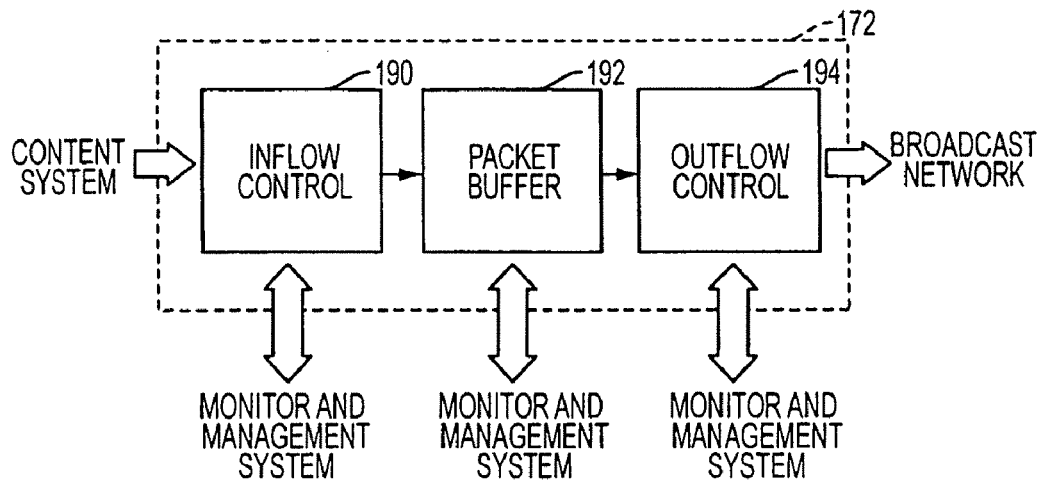
FIG. 16 is a conceptual block diagram illustrating further features of the delivery system employed in the core shown in FIG. 12.

Further details of the delivery system 172 are shown in FIG. 16. These components enable the delivery system to fetch data to be output from the content system 170, and to buffer this stream to provide a constant or substantially constant throughput to the broadcast network 112 (see FIG. 1). Specifically, the deliver system 172 includes an inflow controller 190 that fetches data from the content system 170, a packet buffer 192 that stores the output data, and an outflow controller 194 that sends the data to the broadcast network with a fixed throughput.

Figure 17:
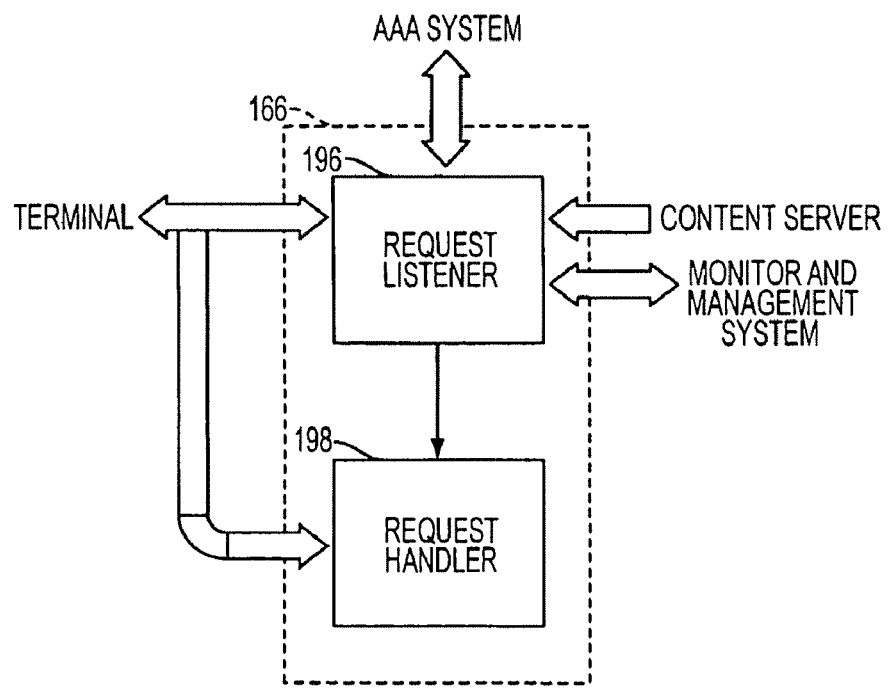
FIG. 17 is a conceptual block diagram illustrating further features of the request system employed in the core shown in FIG. 12.

The delivery system 172 interfaces with the broadcast network 112 through IP (UDP) or any other suitable protocol, interfaces with the content system 170 through function calls from the content system 170, and interfaces with the monitor and management system 168 through function calls from the delivery system 172. The delivery system also can send messages including information pertaining to the bandwidth of output stream (e.g., outflow control), bandwidth of input stream (e.g., inflow control), and the level of buffer and number of starvations (e.g., packet buffer information). The delivery system 172 also can send alarms indicating, for example, muted outflow control, an output/input bandwidth mismatch (outflow/inflow control), and buffer underflow in the packet buffer 192, to name a few. The deliver system 172 can also accept control messages pertaining to muting, flush buffer, and start/stop/restart operations Further details of the request system 166 are shown in FIG. 17. Specifically, the request system 166 can include, for example, a request listener 196 that listens for incoming requests, and a request handler 198 that responds to requests. Accordingly, the request system 166 is able to listen for requests for access to the network 100. When a request arrives, the request system 166 consults an external AAA server 116 (see FIGS. 1 and 14). If access is granted, all necessary broadcast information can be sent in the response. Broadcast information can be stored locally in the request system 166, being updated by the content system 170 when changes occur. The consultation with the AAA system 116 includes the category request to facilitate variable tariffs between categories.

The request system 166 can interface with the content system 170 through function calls from the request system 166, and can interface with the AAA server 116 through IP such as RADIUS or any other suitable protocol. The request system 166 can also provide messages including information pertaining to the load (e.g., number of requests served in specific time intervals), and can provide alarms indicating, for example, that the AAA server 116 not responding or that content has been paused. The request system 166 can accept control messages indicating a pause in content, as well as a start/stop/restart operations.

Figure 18:
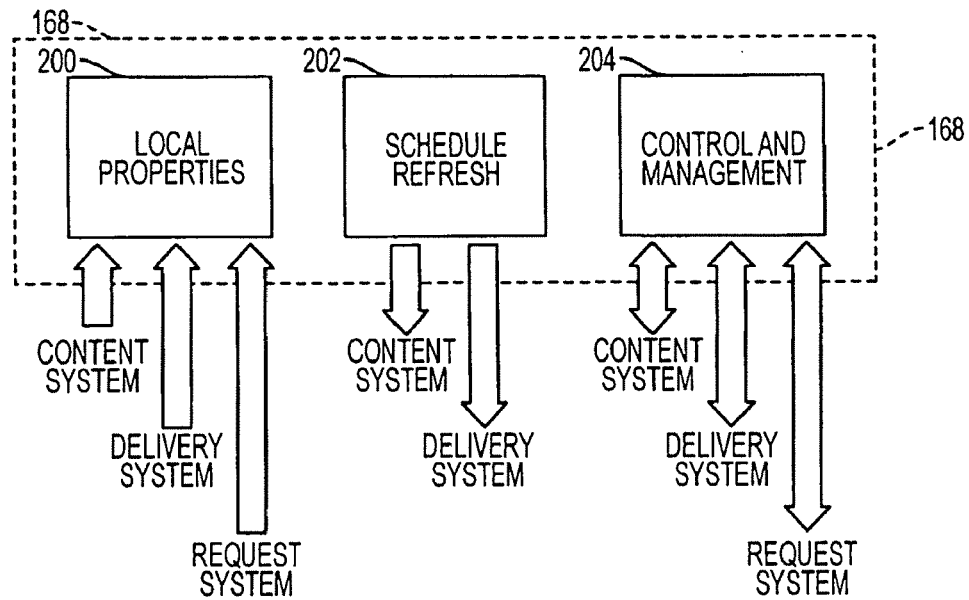
FIG. 18 is a conceptual block diagram illustrating further features of the monitor and management system employed in the core shown in FIG. 12.

Further details of the monitor and management system 168 are shown in FIG. 18. The monitor and management system 168 includes, for example, a local properties module 200 that provides access to persistent properties, a schedule refresh module 202 that checks for schedule updates and pushes them to the subsystems, and a monitor and control logging module (e.g., control and management module 204) for monitoring and logging of select system variables and sending of control messages. Accordingly, the monitor and management system 168 fetches information from other subsystems and sends control messages to them. This functionality can be provided through an interface to an external software system. The external system monitors the information, sends schedule updates, and control messages if required. Regulation, if any, can be placed in this subsystem (i.e., automatic triggering of control messages in response to information from the other subsystems).

The monitor and management system 168 interfaces with the content system 170 through function calls from the content system, interfaces with the delivery system 172 through function calls from the delivery system 172, and interfaces with the request system 166 through function calls in the request system 166. Furthermore, the monitor and management system 168 can receive messages from the content system 170 including information pertaining to, for example, bandwidth of output stream (e.g., from the carousel 188), time since last key update, time left of current key set (e.g., encryption), and size of categories (e.g., content preparation). The monitor and management system 168 can also receive alarms indicating, for example that the AAA server 116 not responding, or that content has been paused, to name a few.

The monitor and management system 168 can further request and receive messages from the delivery system 172 including, for example, information indicating the bandwidth of output stream (e.g., outflow control), bandwidth of input stream (e.g., inflow control), and a level of buffer and number of starvations (e.g., packet buffer conditions), to name a few. The monitor and management system can also 168 receive alarms indicating, for example that the outflow control is muted, there is an output/input bandwidth mismatch (outflow/inflow Control), and buffer underflow in the packet buffer, to name a few. In addition, the monitory and management system 168 can receive from the request system 166 load information pertaining to the number of requests served in specific time intervals, as well as alarms indicating, for example that the AAA server 116 is not responding and that outflow control is muted.

The monitor and management system 168 can also send control messages to other subsystems. For example, the monitor and management system 168 can send to the content system 170 messages pertaining to schedule updates, muting, force cache reload, and start/stop/restart operations. The monitor and management system 168 can send to the delivery system 172 messages pertaining to muting, flush buffer, and start/stop/restart operations, and can send to the request system 166 pause and start/stop/restart messages, to name a few.

Figure 19:
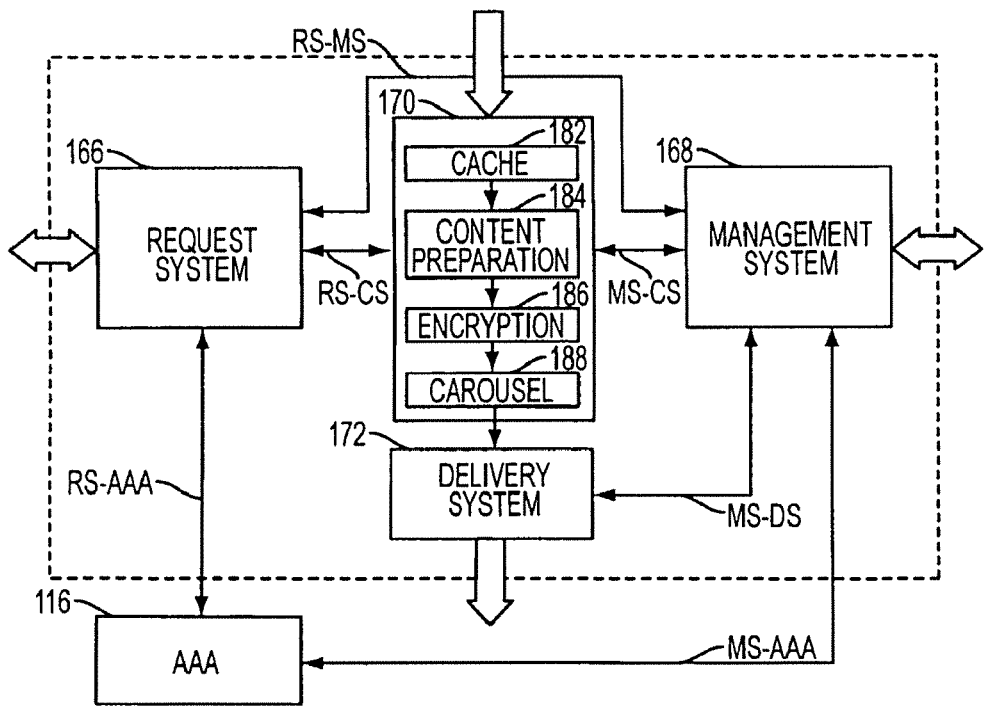
FIG. 19 is a conceptual block diagram illustrating an example of connectivity between the components of the core and other components of the network as shown in FIG. 1.

FIG. 19 illustrates an example of subsystem interfaces between the core 102 subsystems on one hand and between a client 124 and the core 102. As indicated, an MS-AAA interface exists between the management system 168 and the AAA server 116, an MS-CS interface exists between the management system 168 and the content system 170, and an MS-DS interface exists between the management system 168 and the delivery system 172. Also, an MS-RS interface exists between the management system 168 and the request system 166, an RS-AAA interface exists between the request system 166 and the AAA server 116, and an RS-CS interface exists between the request system 166 and the content system 170.

The RS-CS interface allows for encryption key updates. In this example, the content system 170 is responsible for generating a table of keys that are used to encrypt specific portions of the content that is transmitted over the broadcast channel. To minimize communications between the request system 166 and the content system 170, a local copy of the key table is stored in the request system 166. The content system 170 thus implements a standard method of updating the key table stored locally in the request system 166, which happens when both the application is initially started and also when new keys are generated by the content system 170.

In addition, a table of encryption keys are sent to the request system 166, and the content system 170 contacts the request system 166 and specifies the contents of the new key table. In addition, each request issued by a client 124 is mapped to a specific resource locator, e.g., DSM-CC header ID, IP address and port, MPLS label, etc. The content server 170 is aware of all the resources that the application provides. A mapping structure can be a tree or a table that links arbitrary requests to specific resources. The content server 170 maintains a mapping between resources and locators, based on information provided by the monitor and management system 168. This mapping is initially sent to the request system 166 when the application is initialized. Updates are sent each time when the mapping is changed, either because resource locators are changed or the schedule is changed.

The MS-RS interface enables the request system 166 to be able to be manually started, stopped and restarted. The MS-RS interface allows for inputting of a start/stop/restart command, and the request system 166 can thus perform the start/stop/restart operations. The monitor and management system 168 should gather statistics on the number and nature of requests made to the request system 166. This information has practical value to the system operators (e.g., by identifying which content is most popular), but can also be used to adapt the carousel schedule according to user demands.

The monitor and management system 168 further can poll the request system 166 for request statistics at regular intervals, and the request system 166 can gather information on all requests that have been made since the last poll. Output information on each request is returned to the monitor and management system 168. In addition, the request system 166 can alert the monitor and management system 168 if an exception occurs. Possible exceptions include a network error (e.g., the request system 166 is unable to bind sockets, etc.), overload (e.g., the request system 166 is unable to handle all requests), and AAA communication error (e.g., the AAA server 116 is not responding, etc.). To ensure that the request system 166 is functioning correctly, even if no exceptions have been reported, the monitor and management system 168 should regularly poll the request system 166 for its runtime status. If the request system 166 does not respond, the monitor and management system 168 may assume that either the request system 166 is not running or that there is something preventing communication between the two systems. If an exception occurs, the request system 166 can send a corresponding message to the monitor and management system 168. The monitor and management system 168 can also poll the request system 166 for status indication at regular intervals (configurable through the monitor and management system 168). If an exception is reported or if the monitor and management system 168 does not respond to polling messages, the monitor and management system 168 should alert the system administrator (e.g., by sending an e-mail message).

The MS-CS interface makes it possible to update the carousel schedule at runtime. Such updates are either initiated directly by a system administrator (e.g., when there is need to define a new content category) or by the management system itself, based on request statistics or a pre-scheduled change (e.g., separate schedules for daytime and evenings).

A system administrator either directly alters the schedule (e.g., through the user interface of the management system 168) or the monitor and management system 168 triggers an update based on request statistics it has collected from the request system 166 (e.g. if a category with a low priority suddenly becomes more popular than a category with high priority, the monitor and management system 168 might decide to switch the priority of the two categories). The content system 170 updates its local content schedule, and the monitor and management system 168 sends information on the new schedule to the content server 168.

A force cache reload can also occur via this interface, which makes it possible to manually reload the content system 170 cache at runtime. For example, a command for cache reload can be received, upon which the content system 170 clears and then reloads the cache. The interface also enables the content system 170 to be manually started/stopped/restarted when a start/stop/restart command is received by the content system 170 starts/stops/restarts. The monitor and management system 168 can also listen for information on the status of the content system 170. The information provided includes bandwidth of output stream (carousel 188), time since last key update, time left of current key set (encryption information), and size of categories (content preparation information).

The monitor and management system 168 can request the information from the content system 170 at regular intervals. The content system 170 gathers the requested information, and outputs the requested information. The content system

170 can also alert the monitor and management system 168 if an exception occurs. Possible exceptions include missing content such that the content system 170 is unable to locate some of the content on the schedule, inaccessible content which is content that has been located is inaccessible, and a conflict that occurs when content size is suddenly changed, for example.

To ensure that the content system 170 is functioning correctly, even if no exceptions have been reported, the content system 170 can regularly report to the monitor and management system 168 with a status indication. If the content system 170 has not reported within a certain interval, the monitor and management system 168 may assume that either the content system 170 is not running or that there is something preventing communication between the two systems. In either case, the monitor and management system 168 can report the error to the system administrator.

If an exception occurs, the content system 170 sends a corresponding message to the monitor and management system 168. The content system 170 also sends a status indicator at regular intervals (configurable through the monitor and management system 168) to the monitor and management system 168. If an exception is reported or if the content system 170 has not reported within a certain interval, the monitor and management system 168 should alert the system administrator (e.g., by sending an e-mail message).

The MS-DS interface allows for manual start/stop/restart of the delivery system 172. When a start/stop/restart command is received, the delivery system 172 starts/stops/restarts as appropriate. Also, the delivery system 172 buffer can be manually flushed at runtime when a command for buffer flushing is received. The monitor and management system 168 should listen for information on the status of the delivery system 172. Information provided can include bandwidth of output stream (outflow control), bandwidth of input stream (inflow control), and level of buffer and number of starvations (packet buffer).

The monitor and management system 168 requests information from the DS at regular intervals. The delivery system 172 gathers and outputs the requested information. The delivery system 172 should alert the monitor and management system 168 if an exception occurs. Possible exceptions include muting (outflow control), output/input bandwidth mismatch (outflow/inflow control) and buffer underflow (packet buffer).

To ensure that the delivery system 172 is functioning correctly, even if no exceptions have been reported, the delivery system 172 should regularly report to the monitor and management system 168 with a status indication, as described for the request system 166. If an exception occurs, the delivery system 172 can send a corresponding message to the monitor and management system 168. The delivery system 172 also can send a status indicator at regular intervals (configurable through the monitor and management system 168) to the monitor and management system 168. If an exception is reported or if the delivery system 172 has not reported within a certain interval, the monitor and management system 168 should alert the system administrator (e.g., by sending an e-mail message).

The RS-AAA interface enables each client 124 that issues a request to the request system 166 to be authenticated. Moreover, every request has to be authorized, since different users may have different access privileges. The request system 166 sends the user name and password of the client 124, along with the ID of the content category requested, to the AAA server 116 which attempts to authenticate the user and determine whether the request is authorized. The AAA server 116 outputs a message indicating whether the user is authenticated and whether the requested access is authorized.

The MS-AAA interface enables billin tgf6g rules to be implemented. For example, the AAA server 116 needs to bill the client 124 for the content that the client 124 receives. The monitor and management system 168 therefore provides the AAA server 116 with information on how different requests should be billed (e.g., different content categories maybe charged differently). The interface can receive mapping of arbitrary requests to billing/price categories. The mapping function may be implemented as a tree search, hash function, table lookup, and so on. The AAA server 116 can thus store the new mapping function/structure.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A network core for delivering content, comprising:
a processor;
a memory;
a request handler configured to receive a request for content wirelessly transmitted by a mobile client and establish a delivery schedule of the content;
a content preparation unit configured to format the requested content for transmission in packets;
an encryption module configured to encrypt headers of the packets and a download information data message including information pertaining to delivery of the packets in accordance with an encryption algorithm and encryption keys to create formatted encrypted requested content and an encrypted download information data message, the encrypted download information data message including module data identifying all modules about to be broadcast, block size data indicating a block size which is the same for all modules in the packets to be delivered and protocol information for each of the modules in the packets;
a carousel configured to receive the formatted encrypted requested content and the encrypted download information data message, and further configured to schedule delivery of the formatted encrypted requested content in accordance with the delivery schedule, the module data, the block size data and the protocol information; and
a delivery system configured to receive the formatted encrypted requested content from the carousel in accordance with the delivery schedule and wirelessly broadcast the formatted encrypted requested content for receipt by the mobile client in accordance with the delivery schedule and the information pertaining to delivery of the packets included in the encrypted download information data message.

2. A network core as claimed in claim 1, wherein:
the carousel is configured to store the formatted encrypted requested content among a hierarchical collection of categories.

3. A network core as claimed in claim 2, wherein:
each of the categories has at least one of the following characteristics: a size different from that of the other categories, and a transmission interval different from that of the other categories.

4. A network core as claimed in claim 2, wherein:
the carousel is configured to mix those of the categories having a particular transmission frequency into an output stream provided to the delivery system.

5. A network core as claimed in claim 2, wherein:
the carousel is configured to output the formatted encrypted content belonging to at least one of the categories once every carousel cycle and to output the formatted encrypted content belonging to at least one other of the categories once every plurality of carousel cycles.

6. A network core as claimed in claim 1, wherein:
the delivery schedule includes information describing the whereabouts of the content in the network, how to access such content and frequency of updates of the content.

7. A network core as claimed in claim 1, wherein:
a location at which the formatted encrypted requested content is present in the carousel is adjusted based on a popularity of the requested content as determined based on request statistics.

8. A method for operating a network core to deliver content, the method comprising:
operating the network core to receive a request for content wirelessly transmitted by a mobile client and establish a delivery schedule of the content;
operating the network core to format the requested content for transmission;
operating an encryption module in the network core to encrypt headers of the packets and a download information data message including information pertaining to delivery of the packets in accordance with an encryption algorithm and encryption keys to create formatted encrypted requested content and an encrypted download information data message, the encrypted download information data message including module data identifying all modules about to be broadcast, block size data indicating a block size which is the same for all modules in the packets to be delivered and protocol information for each of the modules in the packets;
operating a carousel in the network core to receive the formatted encrypted requested content and the encrypted download information data message, and schedule delivery of the formatted encrypted requested content in accordance with the delivery schedule, the module data, the block size data and the protocol information; and
operating a delivery system in the network core to receive the formatted encrypted requested content from the carousel in accordance with the delivery schedule and the information pertaining to delivery of the packets included in the encrypted download information data message, and wirelessly broadcast the formatted encrypted requested content for receipt by the mobile client in accordance with the delivery schedule.

9. A method as claimed in claim 8, wherein:
the carousel operating includes operating the carousel to store the formatted encrypted requested content among a hierarchical collection of categories.

10. A method as claimed in claim 9, wherein:
each of the categories has at least one of the following characteristics: a size different from that of the other categories, and a transmission interval different from that of the other categories.

11. A method as claimed in claim 9, wherein:
the carousel operating includes mixing those of the categories having a particular transmission frequency into an output stream provided to the delivery system.

12. A method as claimed in claim 9, wherein: the carousel operating includes operating the carousel to output the formatted encrypted requested content belonging to at least one of the categories once every carousel cycle and to output the formatted encrypted requested content belonging to at least one other of the categories once every plurality of carousel cycles.

13. A method as claimed in claim 8, wherein:
the delivery schedule includes information describing the whereabouts of the content in the network, how to access such content and frequency of updates of the content.

14. A method as claimed in claim 8, wherein:
a location at which the formatted encrypted requested content is present in the carousel is adjusted based on a popularity of the requested content as determined based on request statistics.

15. A network core for delivering content, comprising:
a processor;
a memory;
a request handler configured to receive a request for content from at least one mobile client, format the requested content for transmission in packets, encrypt headers of the packets and a download information data message including information pertaining to delivery of the packets in accordance with an encryption algorithm and encryption keys to create formatted encrypted requested content and an encrypted download information data message, the encrypted download information data message including module data identifying all modules about to be broadcast, block size data indicating a block size which is the same for all modules in the packets to be delivered and protocol information for each of the modules in the packets, the request handler being further configured to provide the formatted encrypted requested content and the encrypted download information data message to a carousel, establish a delivery schedule of the formatted encrypted requested content in the carousel based on statistics pertaining to a number of requests for the content, the module data, the block size data and the protocol information, and provide a content access key to the mobile client in response to the request; and
a delivery system configured to receive the formatted encrypted requested content and the encrypted download information data message from the carousel, and wirelessly broadcast the formatted encrypted requested content in accordance with the delivery schedule established by the request handler and the information pertaining to delivery of the packets included in the encrypted download information data message, for access by the mobile client using the content access key.

16. A network core as claimed in claim 15, wherein:
the delivery schedule includes information describing the whereabouts of the content in the network, how to access such content and frequency of updates of the content.

17. A network core as claimed in claim 15, wherein:
the carousel is configured to receive the formatted encrypted requested content and schedule delivery of the formatted encrypted requested content in accordance with the delivery schedule.

18. A network core as claimed in claim 17, wherein:
a location at which the formatted encrypted requested content is present in the carousel is adjusted based on a popularity of the formatted encrypted requested content as determined based on request statistics.

19. A network core as claimed in claim 17, wherein:
the carousel is configured to store the formatted encrypted requested content among a hierarchical collection of categories.

20. A network core as claimed in claim 17, wherein:
the delivery system is configured to receive the formatted encrypted requested content from the carousel in accordance with the delivery schedule.

* * * * *